Feb. 20, 1934.     N. PIZZUTO     1,947,658
IMPELLER AND SHAFT THEREFOR FOR USE IN CENTRIFUGAL AND TURBINE PUMPS
Filed Feb. 20, 1932
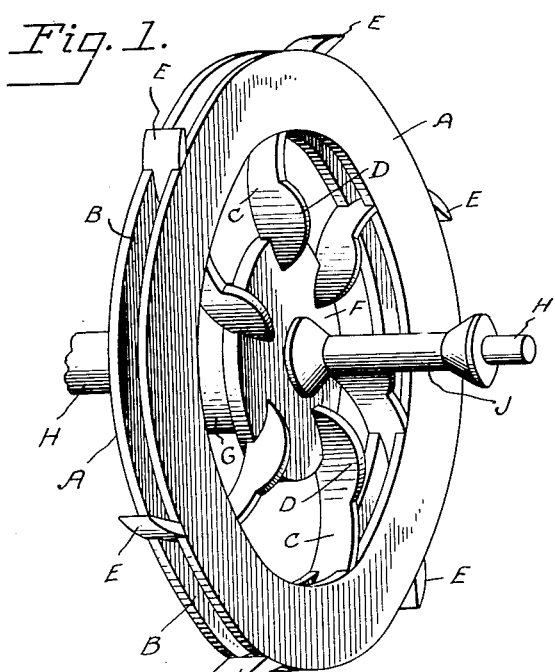
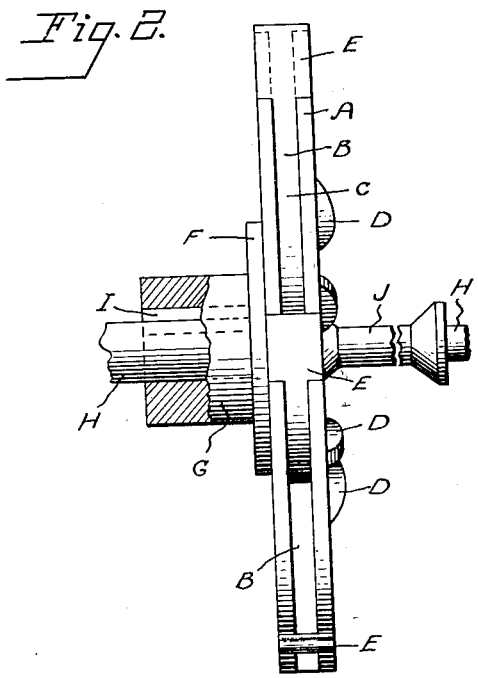
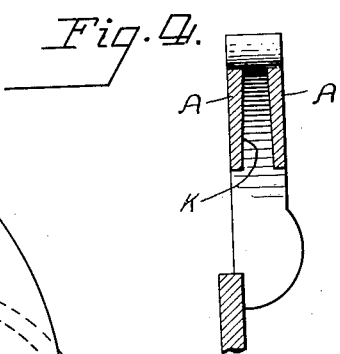
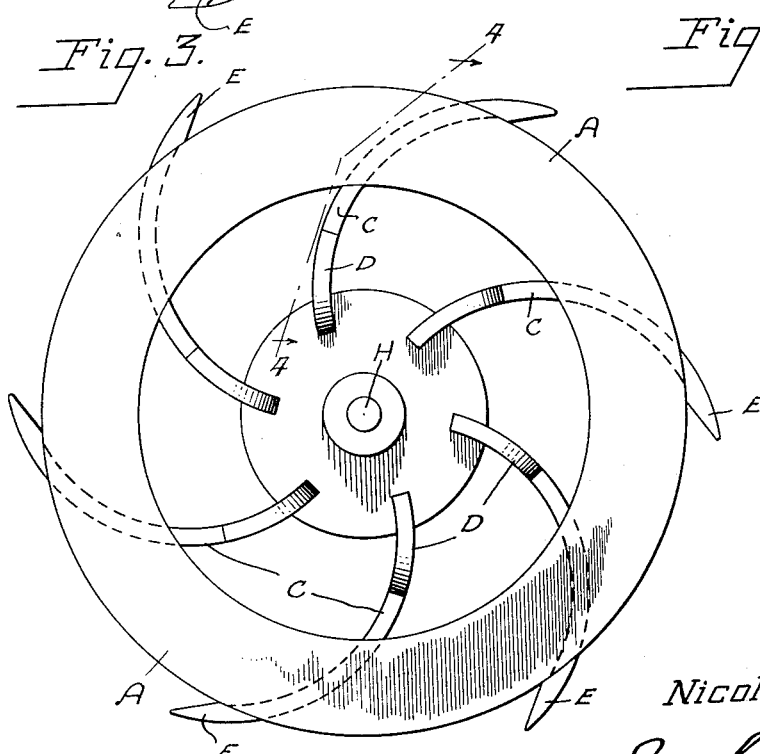
Inventor
Nicolas Pizzuto
By
Attorney Patented Feb. 20, 1934

1,947,658

UNITED STATES PATENT OFFICE

1,947,658

IMPELLER AND SHAFT THEREFOR FOR USE IN CENTRIFUGAL AND TURBINE PUMPS

Nicolas Pizzuto, San Luis Potosi, Mexico

Application February 20, 1932, Serial No. 594,354, and in Mexico December 17, 1931

3 Claims. (Cl. 103—115)

This invention relates to impellers of the type used in centrifugal and turbine pumps.

An object of the invention is to provide an impeller of such construction that the pump is operated free from the usual jerking motion, thereby allowing the water to be raised as smoothly as if it were running on a horizontal plane.

Another object of the invention is to provide a construction whereby the impeller is dynamically balanced, which gives not only silence in operation, but a material increase in the amount of water raised.

In the accompanying drawing:—

Figure 1 is a perspective view of the impeller and its shaft, showing an assembly embodying the invention.

Figure 2 is an edge view of the impeller.

Figure 3 is a side view of the same.

Figure 4 is a detail cross section taken on the line 4—4 of the impeller rim, showing a portion of a spoke.

In the drawing, the impeller comprises a rim A formed with a peripheral slot B, the slot B dividing the rim into two sections, the dimension of the slot radially of the rim A increasing from the outer edge of the rim inwardly, as shown at K in Figure 4. C indicates helically-shaped spokes, which are curvilinear in radial direction of the wheel. The spokes C have sections passing through the slot B and are shaped to fit the walls of the slot to brace the spokes and thereby resist breakage at the juncture of such spokes and rim sections. The portions passing through the slot extend beyond the periphery of the rim to form curvilinear fins E. The projecting ends E of the spokes are of the same width as the rim A, and are arranged in the same direction and are all of the same construction.

The spokes inwardly of the rim are curved in a radial direction of the wheel, having one side edge flat, this side being embedded in a hub disk F, said disk forming a portion of the hub G. The opposite edges of each of the spokes C are provided with outwardly curved portions D. At the portion D, each spoke is laterally enlarged in the plane of the spoke for a length extending from the inner end of the spoke to a point short of the rim of the wheel A, the enlargement being curved in a direction longitudinally of the spoke, the remaining portion of the spoke being parallel to the first mentioned edge. The enlarged portion D is arranged adjacent the hub G and presents a uniform curved edge which extends from the inner end of the spoke to a point short of the wheel rim A.

The hub G is provided with an opening to receive a shaft H, said shaft and hub being locked together by a key I. The shaft, on the side opposite the portion secured by the key, is provided with a reel-like element J, the shaft being smaller than the reel element and extending outwardly therefrom.

It will thus be seen that this invention would be extremely advantageous in irrigation and other similar operations, because of the saving of power as well as a substantial saving in the amount of water consumed. It is well known that centrifugal and turbine pumps up to two and a half inches are impractical because of the lack of efficiency, large amount of energy consumption, and their large amount of water capacity. These disadvantages are eliminated by the use of an impeller built in accordance with the present invention.

What I claim is:

1. An impeller including a wheel rim formed with a peripheral slot dividing the rim into two sections, the dimension of the slot axially of the rim increasing from the outer edge of the rim inwardly, spokes having sections fitted within said slot and terminal portions projected beyond the slot, the spokes being curvilinear in radial direction of the wheel, with one side edge flat and embedded in a hub disk forming the hub of the wheel, the opposite edge of each spoke being laterally enlarged in the plane of the spoke for a length extending from the inner end of the spoke to a point short of the rim of the wheel, the enlargement being curved in a direction longitudinally of the spoke.

2. An impeller including a wheel rim formed with a peripheral slot dividing the rim into two sections, spokes having sections extending through the slot and projecting beyond the peripheral edge of the rim in the form of curved sections, the spokes inwardly of the rim being curved in a radial direction, a wheel hub in which the inner ends of the spokes are embedded, a similar edge of each of the spokes being in the same curved plane, the opposite edge of each of the spokes being curved axially of the wheel for a distance extending from such inner end of the spoke to a point short of the rim of the wheel, the remaining portion of such edge being substantially parallel to the first mentioned edge.

3. An impeller including a wheel rim made up of spaced parallel sections, a hub of disk form, a series of spokes embedded at their inner ends in the hub and extending through and beyond the sections of the rim, each of said spokes being curved in the radial plane of the wheel and laterally enlarged in one direction axially of the wheel, the said enlargement being arranged adjacent the hub and presenting a uniform curved edge extending from the inner end of the spoke to a point short of the sections of the rim.

NICOLAS PIZZUTO.